(12) United States Patent
Holmes (10) Patent No.: US 11,011,900 B2
(45) Date of Patent: May 18, 2021

(54) ELECTRICAL RECEPTACLE SYSTEM AND METHOD

(71) Applicant: Elliott Holmes, Chesnee, SC (US)

(72) Inventor: Elliott Holmes, Chesnee, SC (US)

( * ) Notice: Subject to any disclaimer, the term of this patent is extended or adjusted under 35 U.S.C. 154(b) by 59 days.

(21) Appl. No.: 16/545,555

(22) Filed: Aug. 20, 2019

(65) Prior Publication Data

US 2021/0057894 A1 Feb. 25, 2021

(51) Int. Cl.
*H02G 3/12* (2006.01)
*H02G 3/14* (2006.01)

(52) U.S. Cl.
CPC .............. *H02G 3/123* (2013.01); *H02G 3/14* (2013.01)

(58) Field of Classification Search
CPC .......... H02G 3/123; H02G 3/12; H02G 3/121; H05K 5/0204
See application file for complete search history.

(56) References Cited

U.S. PATENT DOCUMENTS

| | | | |
|---|---|---|---|
| 4,000,874 A | 1/1977 | Finley et al. | |
| 4,297,525 A | 10/1981 | Bowden, Jr. | |
| 5,434,359 A | 7/1995 | Schnell | |
| 6,093,890 A | 7/2000 | Gretz | |
| 6,102,360 A | 8/2000 | Clegg et al. | |
| 6,170,685 B1 | 1/2001 | Currier | |
| 6,194,657 B1 | 2/2001 | Gretz | |
| 6,346,674 B1 | 2/2002 | Gretz | |
| 6,737,576 B1 | 5/2004 | Dinh | |
| 6,932,628 B1 | 8/2005 | Staedt | |
| RE41,661 E | 9/2010 | Dinh | |
| 8,292,105 B1* | 10/2012 | Gretz | H02G 3/123 220/3.7 |
| 2007/0120029 A1 | 5/2007 | Keung et al. | |
| 2007/0164183 A1* | 7/2007 | Michaud | H02G 3/123 248/300 |
| 2007/0194180 A1 | 8/2007 | Korcz | |
| 2011/0147035 A1* | 6/2011 | Barnes | H02G 3/123 174/50 |

FOREIGN PATENT DOCUMENTS

CA 2728996 5/2010

* cited by examiner

*Primary Examiner* — Timothy J Thompson
*Assistant Examiner* — Amol H Patel
(74) *Attorney, Agent, or Firm* — Southeast IP Group, LLC.; Thomas L. Moses (57) ABSTRACT

An electrical receptacle installation kit includes a pair of brackets and an electrical receptacle having a face plate and a pair of outlets. A pair of screws extend through holes in the faceplate. Each screw includes a pivoting finger secured to a distal end of the screw behind the faceplate. A pair of brackets are provided, and bracket includes a rear plate, a horizontal support, and a front lip. In use, a user places the brackets in the hole provided for the receptacle, so that the rear plate is on the backside of the sheet rock, and the front lip is on the front side of the wall. The receptacle is positioned between the brackets, and the screws are turned so that the fingers rotate until they engage the rear plate, so that the receptacle is secured within the wall.

2 Claims, 6 Drawing Sheets

ELECTRICAL RECEPTACLE SYSTEM AND METHOD

BACKGROUND OF THE INVENTION

The present invention relates generally to electrical receptacles, and particularly electrical receptacles that are used in mobile homes, campers, and the like, where the receptacle is secured within a hole in sheetrock, paneling, or the like, but is not secured or affixed to a wall stud.

Over the years, many types of self-securing electrical outlets have been developed which allow a receptacle to be secured to a wall without the necessity of securing the receptacle to a wall stud. These types of electrical receptacles are typically used where thin walls are present, including places like mobile homes, campers, recreational vehicles, boats, and the like. The following documents show examples of such electrical receptacles and systems, and each of these documents are hereby incorporated by reference herein, in their entireties.

U.S. Pat. No. 4,000,874 Wiring Device with Removable Finger Portion

A wiring device is disclosed of the type having a dielectric housing portion into which the individual conductors of a multi-conductor cable are electrically connected. The housing portion is encircled by a mounting bracket suitable for stud or bracket mounting and convertible to wallboard mounting by, first removing a frangible finger portion of the bracket and then assembling the finger portion over a corner portion of the bracket by a threaded fastener. The wiring device is then inserted in a wallboard opening from the front side. The fastener is turned and the finger is pivoted on the fastener until it projects outwardly of the wiring device. Continued turning of the fastener advances the finger therealong into gripped engagement on the back side of the wallboard, mounting the wiring device securely to the wallboard.

U.S. Pat. No. 4,297,525 Electrical Outlet Box and Pawl Mounting Device

An electrical outlet box having wall areas recessed inwardly from the outermost periphery of the box wall structure, the recessed areas housing pawl mounting devices and electrical power cable entry ports. Each pawl mounting device includes a single stop flange on the outer surface of the box wall structure. The pawl arm includes a hub into which a threaded mounting screw is fastened and extends tangentially of the hub. The pawl arm terminates on one side of the hub in a right-angled stop flange and terminates on the opposite side of the hub in a small tab member. A guide channel adjacent the box stop flange slidably receives the pawl hub to guide the pawl in back and forth linear travel while the rear tab moves freely within a slotted channel formed between the box stop flange and the guide channel. The pawl arm and rear tab are alternatively urged against the box stop flange upon rotating the pawl in opposite directions causing the pawl to travel linearly in both a forward and backward direction.

U.S. Pat. No. 5,434,359 Electrical Box

A nonmetallic electrical box which has mounting surfaces or contacting points, a pair of bosses and a pair of securing arms. The bosses extend from the center of the top and bottom walls of the box for mounting a wiring device within the box, and the securing arms extend from the top and bottom walls for securing the box within the opening of a wall or ceiling. The contacting points are spaced apart along the top and bottom walls, are coplanar and extend outwardly from the top and bottom walls a distance at least equal to the distance the bosses and arms extend outwardly from the top and bottom walls, thereby preventing any side to side rocking motion when the box is mounted within a rectangular opening.

U.S. Pat. No. 6,093,890 Mounting Device

A mounting device for primarily for low voltage wall mounting in which can be mounted communication cable, television cable, fiber optics, or similar low voltage communication devices. The device has a frame, an integral reinforcing flange fitted into a rectangular hole on the wall, and two flags which are rotated front mounted screws for grabbing the rear surface of the will and serve to tighten the mounting device securely to the wall.

U.S. Pat. No. 6,103,360 Faceplate Assembly with Self-Contained Mounting Brackets and Fastening Hardware A faceplate has self-contained fastening devices for securing it in a wall opening, and also has rearwardly projecting flanges and legs that are received in the wall. The flanges locate the faceplate relative to the opening and the legs serve to cooperate with the swinging fastener mounted arms to limit their rotation as the fastener is rotated to bring the arms into contact with the backside of the sheetrock wall structure.

U.S. Pat. No. 6,170,685 Folding Electrical Outlet Box

A foldable, electrical box kit for on-site assembly and installation in wallboard, with at least two opposing panels each having a pair of spaced apart front face flanges and respective, laterally centered on the panel, center-bored, retaining screw and rotating retainer clip assemblies. The unfolded box is configured with living hinge lines to permit easy folding and snap assembly of adjacent sidewall edges to form a rigid enclosure. Retainer clips are retracted by their retaining screws into clip slots in the panels for clearance. The box is inserted through wallboard as far as the front face flanges permit, then the retaining screws are rotated, the first quarter turn of which rotates their respective retaining clips from the retracted position to an extended position behind the wallboard. Further clockwise rotation of each screw brings its retaining clip forward into a firm, three point grip with its respective pair of flanges on the wallboard. Retaining screws are center-bored and threaded, and spaced to accept attaching screws for standard size devices being installed in the box, thereby providing both structure support and a convenient point for electrical ground bonding.

U.S. Pat. No. 6,194,657 Mounting Device

The present invention uses a plastic mounting device having an open front plate extending around an opening in a building wall integral with a closed electrical box extending at right angles therefrom rearward of the front plate and extending into the building wall. The mounting device has two turning screws adapted to turn flags which are inserted into the opening in a "closed" position and grab the far or inside surface of the building wall when the screws are rotated causing the flags to obtain their "open" position. An alternative embodiment incorporates a second set of flags positioned behind the first set for installation in a wall too thick to permit engagement of the first set of flags.

U.S. Pat. No. 6,346,674 Mounting Device

The present invention uses a plastic mounting device having an open front surface extending around an opening in a building wall integral with a closed electrical box extending a right angles therefrom rearward of the front surface and extending into the building wall. The mounting device has two turning screws adapted to turn flags which are inserted into the opening in a "closed" position and grab the far or inside surface of the building wall when the screws are rotated causing the bags to obtain their "open" position. An alternative embodiment incorporates a second set of flags positioned behind the first set for installation in a wall too thick to permit engagement of the first set of flags.

U.S. Pat. No. 6,737,576 Electrical Box Assembly

An electrical box assembly including a box having a base wall perimetrically bounded by a sidewall extending therefrom forming a housing adapted to receive an electrical component. The sidewall having an upper portion and a flange extending outwardly in a transverse direction from the upper portion. An electrical component attachment point is disposed adjacent the sidewall upper portion and adapted for securing an electrical component to the box. The flange is perimetrically bounded by a collar extending outwardly therefrom. A securement device disposed on the box for securing the box to a support structure is provided. A frame is further provided which is in telescopic engagement with the collar and movable relative thereto. The frame has an abutment surface for abutting against a facing surface. An adjustment device is provided for moving the frame relative to the box and urges the abutment surface against the facing surface.

U.S. Pat. No. 6,932,628 Electrical Box with Pivoting Tabs

An electrical box is removeably anchored in an insulated foam building wall panel. The electrical box comprises a receptacle that is inserted into a recess cut in the foam panel. Assembled to the receptacle back wall are one or more tabs. The tabs are pivotable from a storage position inside the receptacle to a working position whereat they project through slots in the receptacle and embed in the foam panel. The tabs are assembled to the receptacle by pivoting members, each comprising a screw that is turnable from outside the receptacle. The pivoting member may produce a friction torque on the tab by gripping the tab between the screw head and a nut. Alternately, the tab may have a non-circular hole that matches and receives a section of the screw to produce a positive torque on the tab. A drag is also produced on each tab to prevent unintentional pivoting.

U.S. Pat. No. RE41661 Electrical Box Assembly

An electrical box assembly including a box having a base wall perimetrically bounded by a sidewall extending therefrom forming a housing adapted to receive an electrical component. The sidewall having an upper portion and a flange extending outwardly in a transverse direction from the upper portion. An electrical component attachment point is disposed adjacent the upper portion and adapted for securing an electrical component to the box. The flange is perimetrically bounded by a collar extending outwardly therefrom. A securement device disposed on the box for securing the box to a support structure is provided. A frame is further provided which is in telescopic engagement with the collar and movable relative thereto. The frame has an abutment surface for abutting against facing surface. An adjustment device is provided for moving the frame relative to the box and urges the abutment surface against the facing surface.

U.S. Patent Publication No. 20070120029 a Modular Wall Mounting Apparatus

The configurable wall mount presented herein has particular applicability to supporting electronic devices mounted in walls and ceilings. The configurability stems from modular components configured to be coupled together. Thus, the wall mount is configurable for mounting devices ranging from small communications connectors to large electronic control panels.

U.S. Patent Publication No. 20070194180 Mounting Bracket for an Electrical Device A mounting bracket is provided for mounting to an opening in a wall. The mounting bracket is for an electrical box or electrical device such as a switch, plug or fire alarm for mounting the electrical box or device to a wall without the need for an additional mounting structure. The mounting bracket includes a central opening for receiving the electrical device. At least two legs are integrally formed with a face plate of the bracket and bent perpendicular to the face plate to extend into an opening formed in the wall. A pivotal arm is mounted in each leg and coupled to a screw for limited pivotal movement to pivot the arms between a first retracted position and a second extended position to attach the mounting plate to the wall. The screw is rotated to draw the arm toward the face plate to contact the inner surface of the wall and draw the face plate into contact with the outer surface of the wall.

Canadian Patent No. CA2728996 Electrical Box for Installation in Insulated Concrete Form Construction Various embodiments of an electrical box are provided for installation in insulated concrete forms ('ICFs") In at least one embodiment, the electrical box includes a container configured to receive an electrical device, and at least one anchoring member operably connected to the container In these embodiments, the anchoring member is mov-able between a storage position and an insert-ed position and the anchoring member is operable by a user without a tool Further, in these embodiments, the inserted position includes at least part of the anchoring member positioned outside the container such that the anchoring member is insertable into, for in-stance, a foam-based ICF Thus simple and efficient installation of electrical boxes in ICFs is provided.

One issue with all of the above-referenced designs is that none of them provide any reinforcement around the hole in the sheetrock, to prevent the various tabs or other securing devices from tearing through the sheetrock when force is applied while removing a plug from an outlet. Oftentimes, when removing a plug from an electrical receptacle that is not secured to a wall stud, people will pull on the cord to remove the plug from the outlet. If the plug is set tightly into the receptacle, occasionally the force applied by the person trying to remove the plug from the outlet results in the outlet breaking loose from the wall. When that happens, the result is often a jagged, enlarged hole in the wall where the receptacle was originally positioned, and many times the wiring comes loose from the receptacle, leaving hot wires still in the wall or hole, which becomes an immediate safety issue.

To fix this problem, an electrician often has to first repair the hole in the wall, and then rewire and reinstall the receptacle, which may be costly and time consuming, and does not usually address the underlying problem that pulling on a cord may again cause the receptacle to break away from the wall in the future.

Therefore, it would be desirable to provide an electrical outlet and a pair of brackets that provide reinforcement on the backside of the wall, so that the rotating or pivoting tabs are in contact with brackets, which prevents the tabs from pulling through the wall when pulling pressure is applied to an electrical cord that is plugged into the outlet. Further, it would be desirable to provide an electrical outlet and brackets that are inexpensive to manufacture, easy to install, and more permanently secured in a wall without the necessity of attaching the receptacle to a wall stud.

SUMMARY OF THE INVENTION

The above objectives are accomplished according to the present invention by providing, in a first embodiment, an electrical receptacle that includes a face plate and a pair of screws extending through holes positioned within the face plate. Preferably the holes are adjacent diagonally opposed corners of the face place (for example, one hole adjacent the top left corner and the other in the bottom right corner). On the distal end of each screw, behind the face plate, a pivoting finger is secured thereto, so that when the screw is turned, the pivoting finger rotates therewith.

A pair of brackets are provided, and each bracket includes a rear plate, a horizontal support, and a front lip. In use, a user or electrician places the brackets in the hole provided for the receptacle, so that the rear plate is on the backside of the sheet rock, and the front lip is on the front side of the wall. After the wiring has been connected to the rear portion of the receptacle, the receptacle is then positioned between the brackets, so that one bracket is above the receptacle, and one bracket is below the receptacle. Then, the screws are turned so that the fingers rotate until they engage the rear plate, so that the receptacle is secured within the wall.

In this way, the brackets prevent the fingers from pulling through the walls when excessive force is used to pull a plug out of the outlet. The rear plate of each bracket is positioned between the fingers and the sheetrock, so that the pressure applied to remove a plug from the outlet is spread out across the back plate, rather than focused or concentrated on a small portion of the sheetrock that otherwise would be in contact with the rotating or pivoting fingers.

DESCRIPTION OF THE DRAWINGS

The invention will be more readily understood from a reading of the following specification and by reference to the accompanying drawings forming a part thereof, wherein an example of the invention is shown and wherein:

FIG. 6 is a perspective view of one embodiment of the present invention, showing brackets for use in securing an electrical receptacle to a wall, panel, or the like.

DESCRIPTION OF A PREFERRED EMBODIMENT

Figure 1:
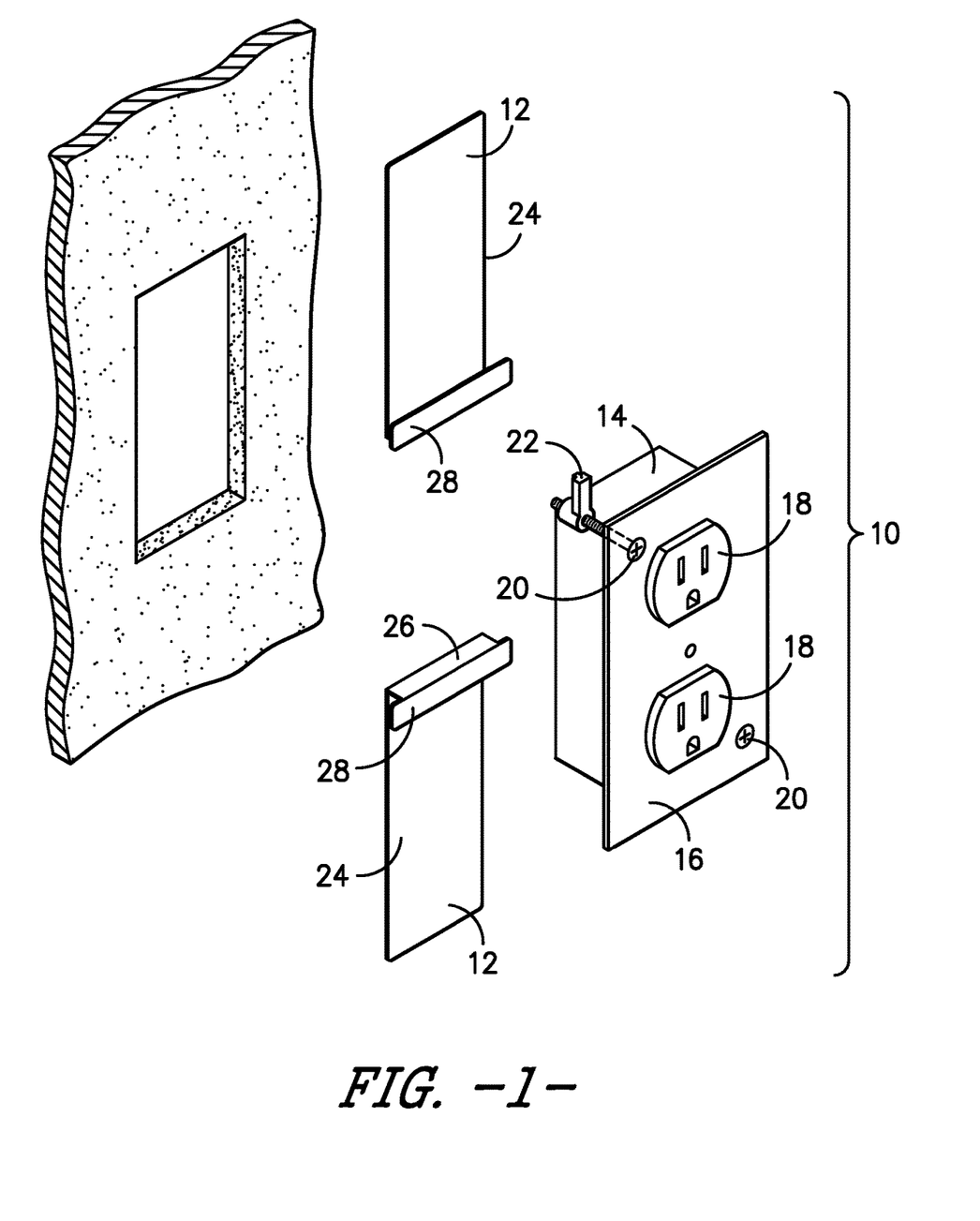
FIG. 1 is a perspective view of one embodiment of an electrical receptacle system installed on an opening in a sheetrock wall.
Figure 2:
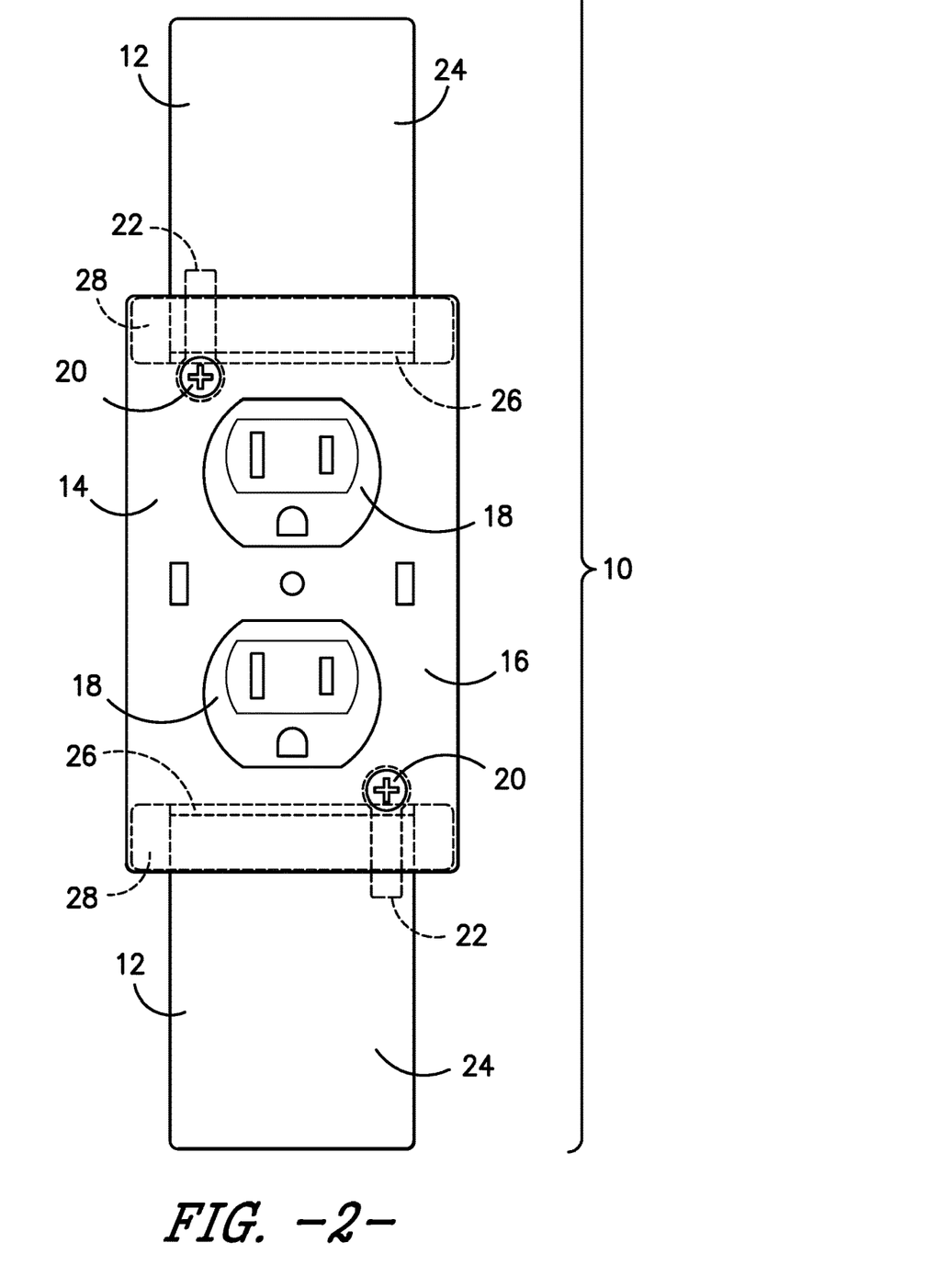
FIG. 2 is an exploded view of one embodiment of an electrical receptacle face plate and an electrical receptacle with brackets installed.
Figure 3:
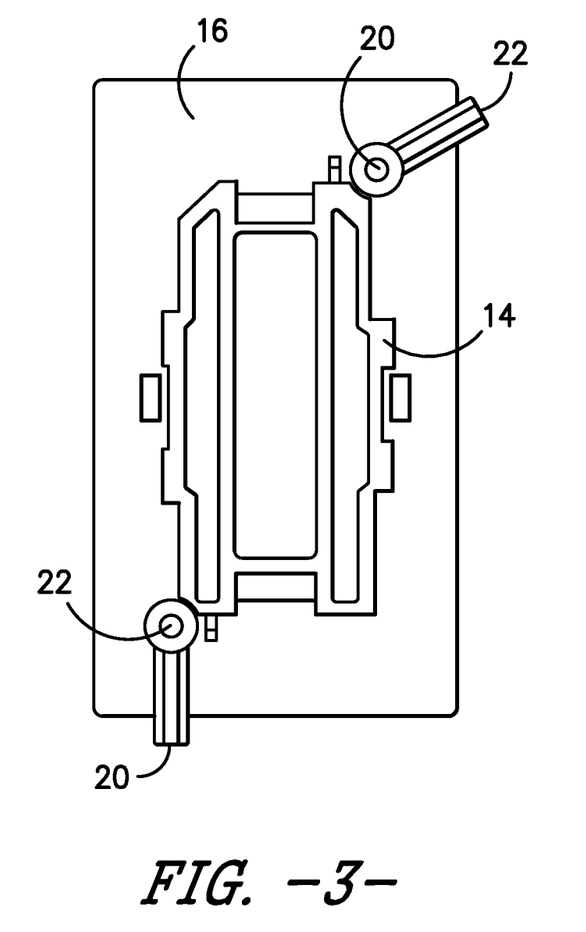
FIG. 3 is a front view of one embodiment of the present invention, showing brackets in broken lines behind the sheetrock and electrical outlet plate.

Referring now to the drawings, the invention will be described in more detail. An electrical receptacle installation kit 10 includes a pair of brackets 12 and an electrical receptacle 14 having a face plate 16 and a pair of outlets 18, as shown in FIG. 1. A pair of screws 20 extend through holes in the faceplate, and in a preferred embodiment, the holes are positioned adjacent diagonally opposed corners thereof (for example, one hole in the top left corner of the face plate 16, and the other hole in the bottom right corner). Each screw includes a pivoting finger 22 secured to a distal end of the screw behind the faceplate 16, so that the finger 22 is disposed at a generally right angle with respect to the longitudinal direction of the screw 20. As the screw 20 is rotated, the pivoting finger 22 rotates, as well. The pivoting fingers 22 are positioned so that they may be tucked in behind the faceplate 16 for insertion of the receptacle 14 into the wall, and then may be rotated to secure the receptacle 14 to the wall. Other embodiments may include more or less screws 20 having pivoting fingers 22, and the screws 20 and pivoting fingers 22 may be positioned in any desirable location behind the faceplate 16 or with respect to the receptacle 14, so long as the pivoting fingers 22 may be rotated to a low profile position for placement in a hole in a wall, and then may be rotated to affix the receptacle 14 to the wall.

Figure 6:
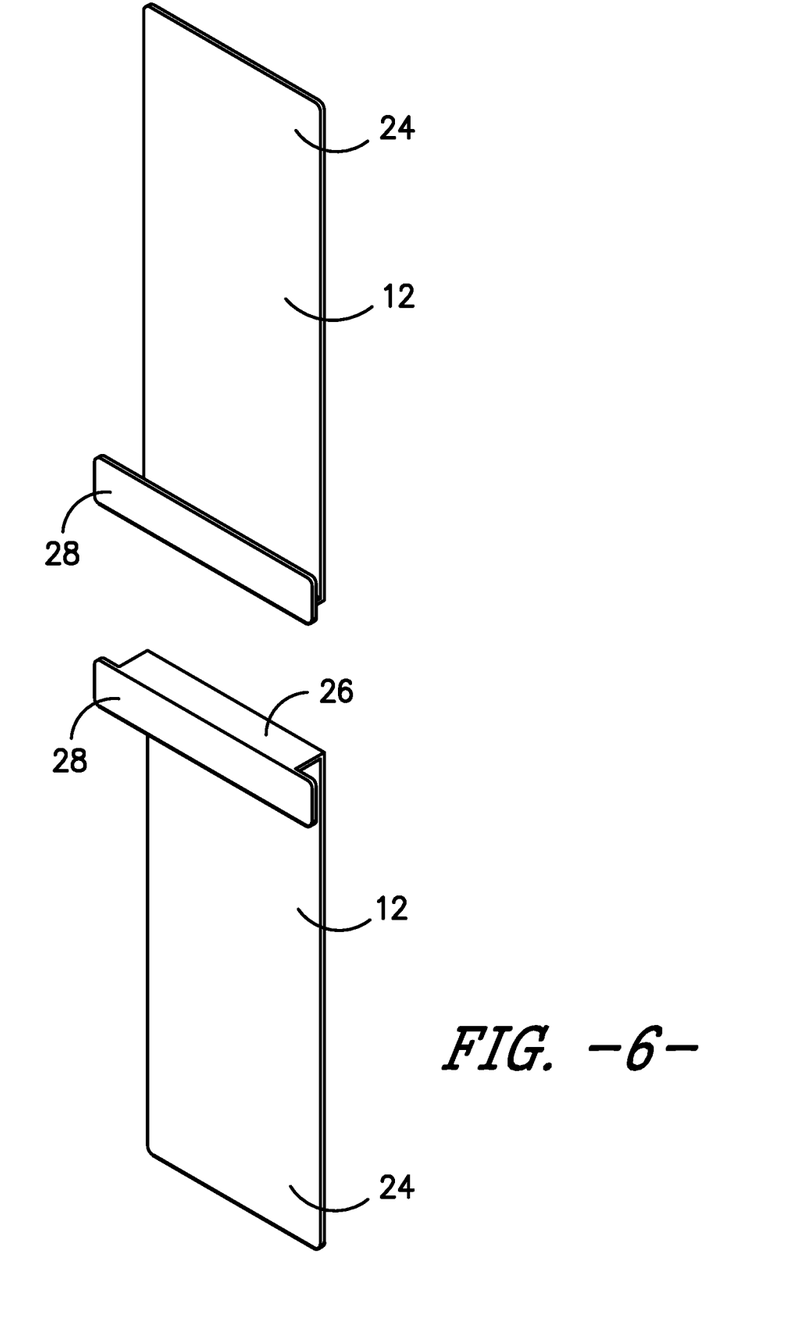

A pair of brackets 12 are provided, and each bracket includes a rear plate 24, a horizontal support 26, and a front lip 28. The brackets 12 are configured to attach to an edge of an opening in the sheetrock so that the rear plate 24 extends vertically behind the sheetrock. The rear plate 24 and the front lip 28 are generally parallel to one another, and are disposed at a generally right angle with respect to the horizontal support 26. In one preferred embodiment, the front lip 28 and/or the rear plate 24 may be slightly bent inwardly, so that the front lip 28 and rear plate 24 may 'clip' to the wall, so that an installer does not need to hold the brackets 12 in place while the receptacle 14 is being installed therebetween. The slight inward bend provides a frictional engagement between the front lip 28 and the rear plate 24, so that the sheetrock is pinched therebetween.

Figure 4:
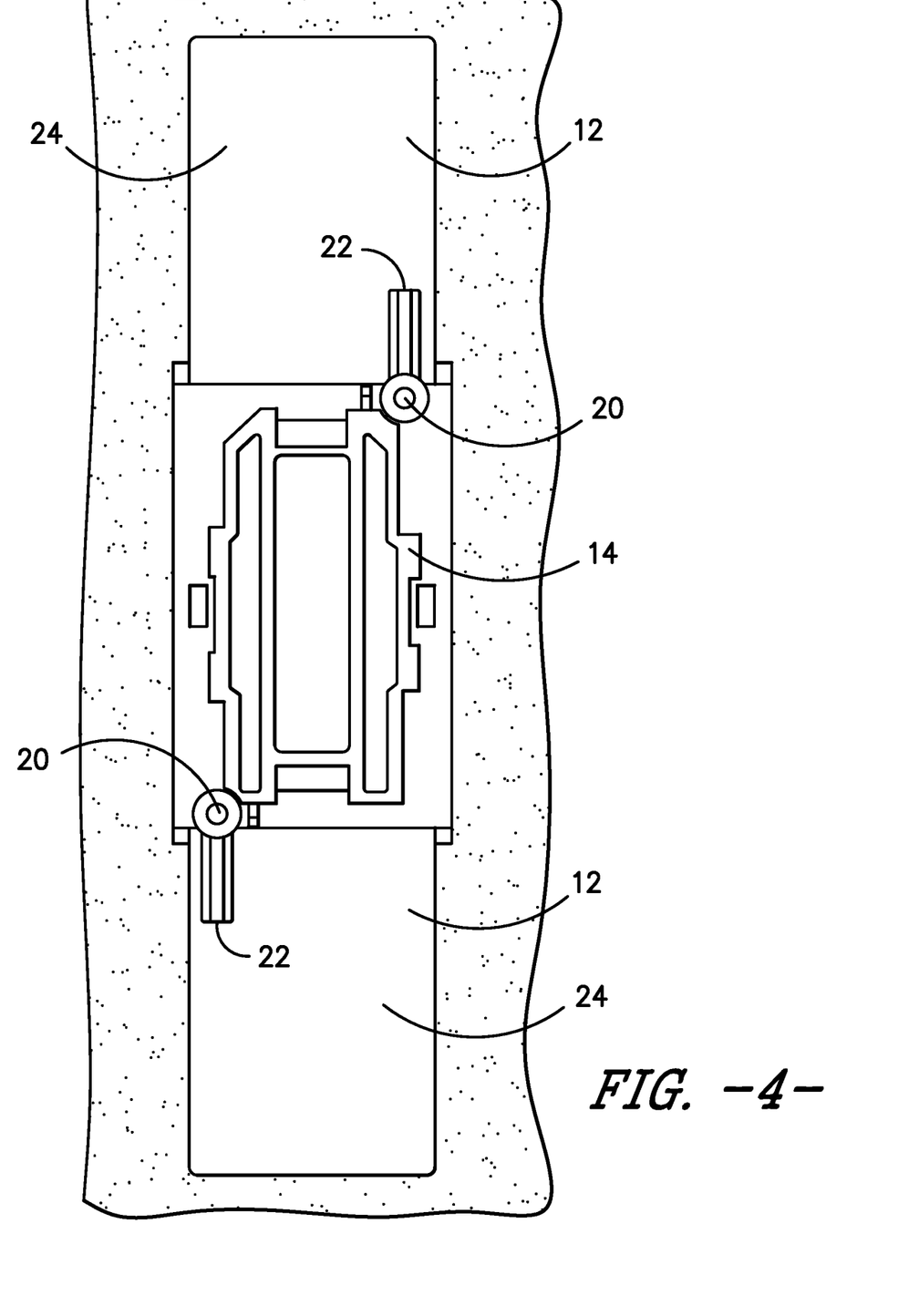
FIG. 4 is a rear view of one embodiment of an electrical receptacle system installed on an opening in a sheetrock wall, wherein the receptacle is disposed between and upper bracket and a lower bracket.

In use, a user or electrician places the brackets 12 in the hole provided for the receptacle 14, so that the rear plate 24 is positioned against the backside of the sheet rock, and the front lip 28 is positioned against the front side of the wall. After the wiring has been connected to the rear portion of the receptacle 14, the receptacle 14 is then positioned between the brackets 12, so that one bracket 12 is above the receptacle 14, and one bracket 12 is below the receptacle 14. Then, the screws 20 are turned so that the fingers 22 rotate until they engage the rear plate 24, so that the receptacle is secured within the wall.

Figure 5:
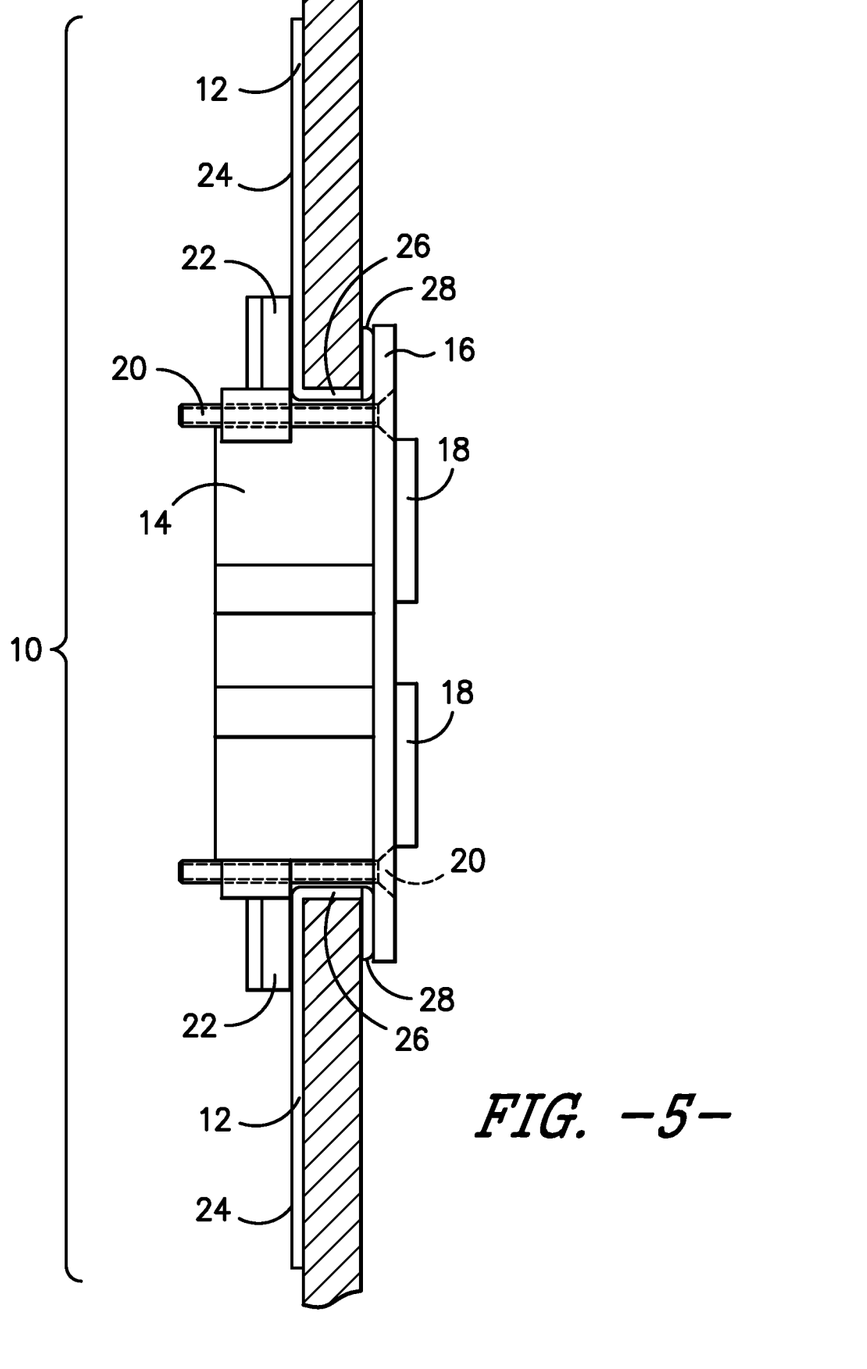
FIG. 5 is a cross-sectional view of one embodiment of an electrical receptacle and brackets installed in a sheetrock wall.

In this arrangement, the brackets 12 prevent the fingers 22 from pulling through the walls when excessive force is used to pull a plug out of one of the outlets 18. The rear plate 24 of each bracket 12 is positioned between the fingers 22 and the sheetrock, so that the pressure applied to remove a plug from the outlet 18 is spread out across the rear plate 24, rather than focused or concentrated on a small portion of the sheetrock that otherwise would be in contact with the rotating or pivoting fingers 22.

It should be understood that brackets 12 of different sizes may be used to accommodate walls, panels, or the like that have different thicknesses. In a preferred embodiment, the brackets 12 are made from a plastic or metal, although they may be made from any suitable material. The face plate 16 may be integrally formed with the receptacle 14, or may be detachable, as desired. It should also be understood that other mechanisms may be used to secure the receptacle 14 to the wall rather than rotating fingers 22, particularly including the various mechanisms described in the documents that are incorporated herein by reference, as set forth above. It is contemplated that the electrical receptacle 14 may have any desired number of electrical outlets 18 affixed thereto or formed therein, as desired, without departing from the spirit or scope of the present invention.

Although the present invention has been described in considerable detail with reference to certain preferred versions thereof, other versions are possible. Therefore, the spirit and scope of the appended claims should not be limited to the description of the preferred versions contained herein. All features disclosed in this specification may be replaced by alternative features serving the same, equivalent or similar purpose, unless expressly stated otherwise. Thus, unless expressly stated otherwise, each feature disclosed is one example only of a generic series of equivalent or similar features.

I claim:

1. An electrical receptacle installation kit comprising:
    an electrical receptacle having at least one electrical outlet, and including a face plate on a front side thereof;
    an upper bracket and a lower bracket, each bracket including a rear plate, a horizontal support, and a front lip;
    wherein each said rear plate is connected to each said horizontal plate at an angle of 90 degrees or less;
    wherein each said front lip is connected to each said horizontal plate at an angle of 90 degrees or less;
    said upper bracket being disposed above said electrical receptacle so that said rear plate extends upwardly and said lower bracket being disposed below said electrical receptacle so that rear plate extends downwardly;
    wherein said brackets are configured to secure an electrical receptacle to an opening in a wall; and
    at least one screw extending through a hole in said face plate, said screw including a pivoting finger attached at a distal end thereof behind said faceplate, so that said pivoting finger rotates when said screw is turned, and engages at least one of said rear plates for temporary securement of said electrical receptacle to said wall.

2. A method of installing an electrical receptacle into a wall comprising the steps of:
    providing an electrical receptacle with a moving securing mechanism for engaging a rear portion of said wall;
    providing a pair of brackets having a rear plate, a horizontal support, and a front lip;
    affixing one of said brackets to an upper edge of an opening in a wall so that said rear plate is positioned against a backside of said wall;
    affixing the other of said brackets to a lower edge of said opening in said wall so that rear plate is positioned against a backside of said wall;
    inserting said electrical receptacle into said opening in said wall so that one of said brackets is positioned above said electrical receptacle, and the other said bracket is below said electrical receptacle; and
    actuating said movable securing mechanism to engage said rear plate of at least one of said brackets in order to secure said electrical receptacle to said wall.

* * * * *